United States Patent
Yaegashi et al.

(10) Patent No.: US 11,391,871 B2
(45) Date of Patent: Jul. 19, 2022

(54) MANUFACTURING METHOD OF CONCAVE DIFFRACTION GRATING, CONCAVE DIFFRACTION GRATING, AND ANALYZER USING THE SAME

(71) Applicant: Hitachi High-Technologies Corporation, Tokyo (JP)

(72) Inventors: Kenta Yaegashi, Tokyo (JP); Yoshisada Ebata, Tokyo (JP); Takanori Aono, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 143 days.

(21) Appl. No.: 16/645,603

(22) PCT Filed: Nov. 7, 2018

(86) PCT No.: PCT/JP2018/041261
§ 371 (c)(1),
(2) Date: Mar. 9, 2020

(87) PCT Pub. No.: WO2019/130835
PCT Pub. Date: Jul. 4, 2019

(65) Prior Publication Data
US 2020/0278481 A1    Sep. 3, 2020

(30) Foreign Application Priority Data
Dec. 27, 2017 (JP) .............................. JP2017-251088

(51) Int. Cl.
*G02B 5/18* (2006.01)
*G01J 3/18* (2006.01)
(Continued)

(52) U.S. Cl.
CPC .............. *G02B 5/1857* (2013.01); *G01J 3/18* (2013.01); *B29C 59/02* (2013.01); *C25D 5/02* (2013.01); *G01J 2003/1842* (2013.01)

(58) Field of Classification Search
CPC ...... G02B 5/1857; G02B 5/18; G02B 5/1814; G02B 5/1847; G02B 5/1852; G01J 3/18;
(Continued)

(56) References Cited

U.S. PATENT DOCUMENTS 4,030,828 A    6/1977  Sonobe et al.
4,330,175 A *  5/1982  Fujii ................... G02B 5/1857
                                              257/E21.223
(Continued)

FOREIGN PATENT DOCUMENTS

CN    101268012 A    9/2008
CN    101636645 A    1/2010
(Continued)

OTHER PUBLICATIONS

Chinese Office Action received in corresponding Chinese Application No. 201880059819.1 dated Jun. 23, 2021.
(Continued)

*Primary Examiner* — Isiaka O Akanbi
(74) *Attorney, Agent, or Firm* — Mattingly & Malur, PC

(57) ABSTRACT

Easy and accurate mating of a groove interval of a groove pattern of a diffraction grating with a position on a convex fixing substrate is enabled. For this purpose, a concave diffraction grating is fabricated by: transferring a groove pattern formed on a plane diffraction grating and having unequal groove intervals onto a metal thin film; forming a first alignment mark on a convex surface of a fixing substrate having the convex surface to fix the metal thin film; mating a second alignment mark formed on an adhesive surface of the metal thin film with the first alignment mark to perform (Continued)

alignment; bonding the adhesive surface of the metal thin film and the convex surface of the fixing substrate to each other to fabricate a master; and transferring a groove pattern of a metal thin film of the master.

12 Claims, 14 Drawing Sheets

(51) Int. Cl.
  *B29C 59/02* (2006.01)
  *C25D 5/02* (2006.01)
(58) Field of Classification Search
  CPC .... G01J 2003/1842; B29C 59/02; C25D 5/02; B32B 37/12; B32B 37/24; B32B 38/0012; B32B 2551/00; Y10T 156/1028
  USPC .......................... 356/328, 319; 359/566, 355
  See application file for complete search history.

(56) References Cited

U.S. PATENT DOCUMENTS

| | | | | |
|---|---|---|---|---|
| 9,423,360 | B1* | 8/2016 | Kostamo | G02B 27/4255 |
| 2001/0026399 | A1* | 10/2001 | Nakabayashi | G02B 5/1857 |
| | | | | 359/576 |
| 2002/0030889 | A1* | 3/2002 | Sato | G02B 5/1852 |
| | | | | 359/569 |
| 2002/0044345 | A1* | 4/2002 | Takeuchi | G02B 5/1876 |
| | | | | 359/361 |
| 2008/0094694 | A1* | 4/2008 | Yun | G02B 27/4211 |
| | | | | 359/355 |
| 2009/0180185 | A1* | 7/2009 | Hayashi | G02B 5/1852 |
| | | | | 359/566 |
| 2011/0205538 | A1 | 8/2011 | Shibayama et al. | |
| 2015/0034591 | A1* | 2/2015 | Vink | G02B 5/1852 |
| | | | | 216/24 |
| 2015/0192713 | A1* | 7/2015 | Aono | B32B 38/0012 |
| | | | | 359/574 |
| 2016/0282526 | A1* | 9/2016 | Aono | G01N 21/31 |

FOREIGN PATENT DOCUMENTS

| | | |
|---|---|---|
| CN | 106574998 A | 4/2017 |
| JP | 59-1971 B2 | 1/1984 |
| JP | 61-72202 A | 4/1986 |
| JP | 09-5509 A | 1/1997 |
| JP | 2008-145898 A | 6/2008 |
| JP | 2014-182301 A | 9/2014 |
| WO | 2016/059928 A1 | 4/2016 |

OTHER PUBLICATIONS

Extended European Search Report received in corresponding European Application No. 18895679.1 dated Aug. 17, 2021.
Grabarnik, S. et al., "Concave diffraction gratings fabricated with planar lithography", Proc. of SPIE, May 14, 2008, pp. 1-8, vol. 6992, URL: https://doi.org/10.1117/12.781057.
KeieiKUDO, "ABC's and Method of Spectroscopy," Ohmsha, Ltd, Jul. 1985, p. 364.
International Search Report of PCT/JP2018/041261 dated Feb. 12, 2019.
Japanese Office Action received in corresponding Japanese Application No. 2019-562815 dated Apr. 5, 2022.

* cited by examiner

MANUFACTURING METHOD OF CONCAVE DIFFRACTION GRATING, CONCAVE DIFFRACTION GRATING, AND ANALYZER USING THE SAME

TECHNICAL FIELD

The present invention relates to a manufacturing method of a concave diffraction grating, a concave diffraction grating, and an analyzer using the same.

BACKGROUND ART

Diffraction grating is an optical element that is used in a spectrograph of an analyzer and the like and divides light (white light) with various wavelengths mixed by narrow-band wavelength. Minute grooves are cut in a surface of an optical material with a reflection film evaporated onto the surface. As described in Nonpatent Literature 1, types of diffraction gratings include plane diffraction gratings having a flat lattice plane and concave diffraction gratings having a spherical or a non-spherical lattice plane. Unlike the plane diffraction grating, the concave diffraction grating has both an action of spectrally dispersing light and an action of forming an image of light.

Concave diffraction gratings include those having grooves cut at equal intervals and those having grooves cut at unequal intervals. Since unequal intervals of grooves allow an image formation position of diffracted light to be adjusted, an aberration can be corrected and an image can be formed on a plurality of linearly arranged detectors. However, to achieve a high image forming capability with a concave diffraction grating having unevenly spaced grooves, a groove interval and a position on a curved surface must be matched with each other such that the groove interval in respective positions on the curved surface is sized as desired.

Conventionally, concave diffraction gratings are manufactured by using such a machine as a ruling engine to inscribe a groove pattern on a curved substrate to produce a master and replicating the groove pattern of the master on a reflection film, resin, or the like. Meanwhile, a technology of curving a diffraction grating formed on a plane at a desired curvature to produce a master is also proposed.

Patent Literature 1 discloses a method of fabricating a curved diffraction grating, in which: a groove pattern of the diffraction grating is formed on a soft material, such as resin, a metal thin film, or the like, and the soft material is stuck to a substrate curved at a desired curvature to obtain a master. This master is brought into contact with uncured liquid curved diffraction grating material and the material is cured. In Patent Literature 2, a plane diffraction grating substrate is transferred to such a flexible material as silicone resin and the material is fixed on a curved substrate to form a master of a curved diffraction grating. Patent Literature 3 discloses a manufacturing method in which a plane diffraction grating made of silicon is transferred to an amorphous medium and the amorphous material substrate is curved and mounted on a curved fixing substrate.

CITATION LIST

Patent Literature

Patent Literature 1 Japanese Unexamined Patent Application Publication No. Sho 61(1986)-72202
Patent Literature 2 Japanese Unexamined Patent Application Publication No. Hei 9(1997)-5509
Patent Literature 3 Japanese Unexamined Patent Application Publication No. 2014-182301

Nonpatent Literature

Nonpatent Literature 1 KUDO, Keiei, "ABC's and Method of Spectroscopy," Ohmsha, Ltd, July 1985, p. 364

SUMMARY OF INVENTION

Technical Problem

The manufacturing methods disclosed in Patent Literature 1 and Patent Literature 2 both use a soft material when a groove pattern of a diffraction grating is formed; therefore, when a curved diffraction grating is transferred, the shape of the groove pattern largely varies. Meanwhile, the manufacturing method disclosed in Patent Literature 3, a plane diffraction grating made of silicon is transferred to such an amorphous material as glass and the amorphous material substrate is curved and mounted on a curved fixing substrate. As a result, a concave diffraction grating with less variation in groove pattern shape can be manufactured.

When grooves of a diffraction grating are unevenly spaced, the width of each groove of the diffraction grating is so minute as approximately several hundred nm to several μm. A groove interval of such a minute groove pattern and a position on a curved fixing substrate are difficult to be matched with each other. If a direction or a position of a groove is displaced when a plane diffraction grating is mounted on a curved fixing substrate, a high image forming capability in accordance with a design value could not be obtained.

An object of the present invention is to provide a method of manufacturing a highly accurate concave diffraction grating in which when a groove pattern of a diffraction grating formed on a silicon substrate is fixed on a convex fixing substrate, a groove interval of the groove pattern and a position on the convex fixing substrate can be matched with each other with ease and accuracy, a concave diffraction grating obtained by this manufacturing method, and an analyzer using the concave diffraction grating.

Solution to Problem

In a manufacturing method of a concave diffraction grating according to an embodiment of the present invention, a groove pattern having unequal groove intervals, formed on a plane diffraction grating is transferred to a metal thin film; a first alignment mark is formed on a convex surface of a fixing substrate having the convex surface for fixing the metal thin film; a second alignment mark formed on an adhesive surface of the metal thin film is mated with the first alignment mark to perform alignment; the adhesive surface of the metal thin film and the convex surface of the fixing substrate are bonded together to fabricate a master; and the groove pattern of the metal thin film of the master is transferred to fabricate a concave diffraction grating.

Other problems and novel features will be apparent from the description in the present specification and the accompanying drawings.

Advantageous Effects of Invention

Since a groove interval of a groove pattern of a metal thin film and a position on a convex fixing substrate can be matched with each other with high accuracy, a concave diffraction grating having a high image forming capability can be manufactured.

DESCRIPTION OF EMBODIMENTS

Figure 13:
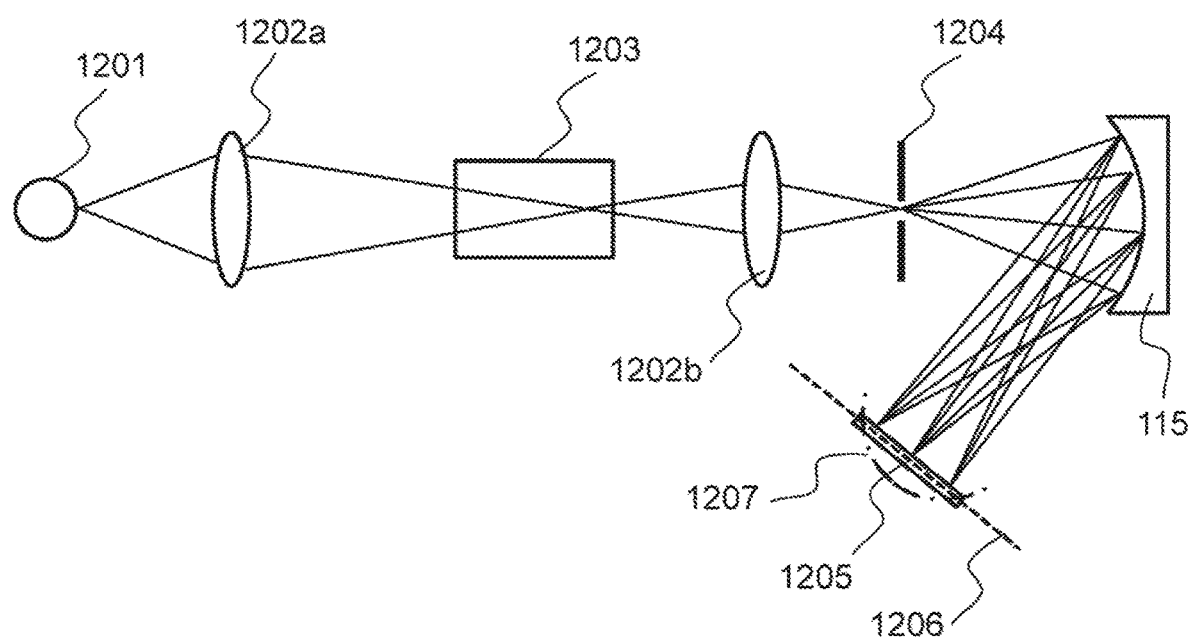
FIG. 13 is a schematic drawing of an analyzer using a concave diffraction grating.

FIG. 13 is a schematic drawing of an analyzer using a concave diffraction grating. Light from a white light source 1201 is condensed by a condenser lens 1202a and applied to a sample chamber 1203. Light transmitted from the sample chamber 1203 is condensed onto an opening of a slit 1204 by a condenser lens 1202b. Light passed through the slit 1204 is wavelength dispersed by a concave diffraction grating 115 to form a spectrum. The formed spectrum is detected with a detector 1205.

A detecting surface 1206 (dotted line) of the detector 1205 is planar and a groove interval of the diffraction grating is so set that an image of a spectrum from the concave diffraction grating 115 will be formed in a position corresponding to the planar detecting surface 1206. When groove intervals of the concave diffraction grating 115 are constant, a surface where an image of a spectrum from the concave diffraction grating 115 is formed is a spherical image formation surface 1207 (alternate long and short dashed line) and does not agree with the detecting surface 1206. As mentioned above, a groove interval of the concave diffraction grating 115 is so designed that an image of a spectrum is formed on the detecting surface 1206. Without a diffraction grating provided on the concave surface of the concave diffraction grating 115 with groove intervals as designed, an image forming capability of the diffraction grating is degraded. Embodiments of the present invention actualize a concave diffraction grating with a high image forming capability by matching a groove interval and a curved surface of a fixing substrate with each other with accuracy during fabrication of a master.

First Embodiment

Figure 1:
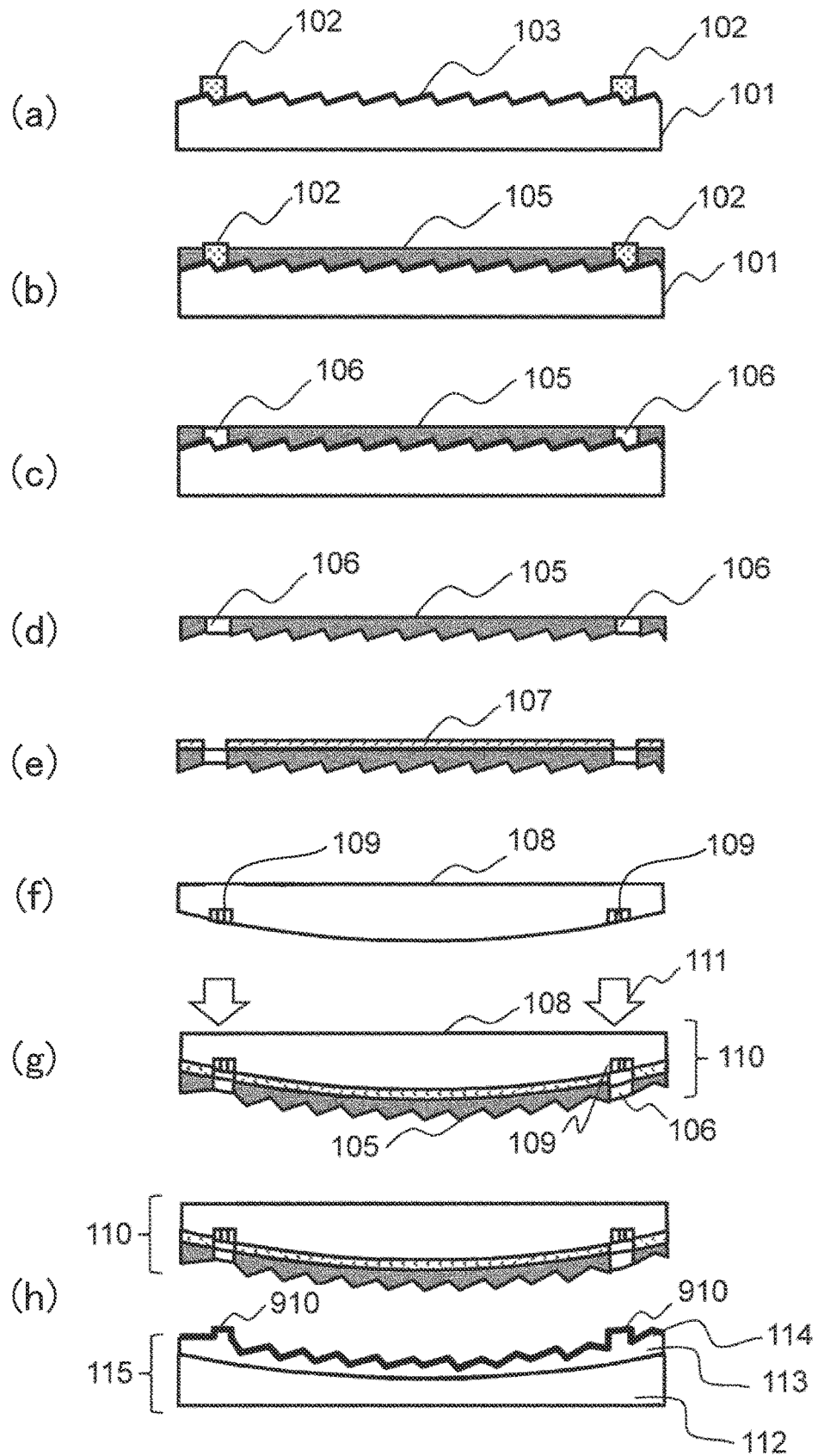
FIG. 1 is a drawing illustrating a manufacturing method of a concave diffraction grating according to a first embodiment.

FIG. 1 illustrates a manufacturing method of a concave diffraction grating as a first embodiment.

(a) An alignment mark forming pattern 102 is formed on a plane diffraction grating 101 obtained by forming a groove pattern 103 on a silicon substrate. Though schematically shown in the drawing, groove intervals of the groove pattern 103 are unequal. As described later, the alignment mark forming pattern 102 may be formed in an area where the groove pattern of the diffraction grating is inscribed as shown in the drawing or may be formed in an area (frame portion) outside the area where the groove pattern of the diffraction grating is inscribed. This process will be described in detail with reference to FIG. 2.

(b) Using electroplating, a metal thin film 105 is formed on the plane diffraction grating 101 with the alignment mark forming pattern 102 formed on the grating. For a material of the metal thin film 105, Ni or the like can be used though not specially limited. As a result, the metal thin film 105 with the groove pattern of the plane diffraction grating 101 transferred onto the film can be fabricated.

(c) After the formation of the metal thin film 105, the alignment mark forming pattern 102 is removed to form a metal thin film-side alignment mark 106 on the metal thin film 105.

(d) The metal thin film 105 is stripped from the plane diffraction grating 101.

(e) Adhesive 107 is applied to a surface of the metal thin film 105 opposite to the surface where the groove pattern is formed.

(f) A convex substrate-side alignment mark 109 is formed on a convex fixing substrate 108. For a material for the convex fixing substrate 108, for example, glass transmitting light is used. The convex substrate-side alignment mark 109 in the convex fixing substrate 108 is provided in such a position that, when mated with the metal thin film-side alignment mark 106 provided in the metal thin film 105, a groove interval of the groove pattern of the metal thin film 105 and the curved surface of the convex fixing substrate are matched with each other. Shapes of the metal thin film-side alignment mark 106 and the convex substrate-side alignment mark 109 will be described later.

(g) The metal thin film-side alignment mark 106 and the convex surface fixing substrate-side alignment mark 109 are checked and fixed using an optical microscope to fabricate a master 110 of the concave diffraction grating. For example, the two marks 106, 109 can be aligned with each other by observing the marks through the transparent convex fixing substrate 108 from the direction of 111. Since the respective alignment marks are provided in surfaces where the metal thin film 105 and the convex fixing substrate 108 are brought into contact with each other, the metal thin film 105 and the convex fixing substrate 108 can be aligned and fixed with each other with high positional accuracy.

(h) The groove pattern of the diffraction grating of the master 110 is transferred to fabricate a concave diffraction grating 115. The concave diffraction grating 115 is constructed by laminating resin 113 having, on a concave surface, the groove pattern of the diffraction grating, a concave fixing substrate 112 where the resin is fixed, and a reflection film 114 covering the surface of the concave shape of the resin 113.

The concave diffraction grating (replica) can also be fabricated by transferring the groove pattern of the concave diffraction grating 115 to fabricate a convex diffraction grating and transferring the groove pattern of the convex diffraction grating. A thus fabricated concave diffraction grating (replica) can also be used as a concave diffraction grating of an analyzer. By repeating replication to fabricate a diffraction grating as mentioned above, a large number of concave diffraction gratings can be fabricated from a small number of masters.

Figure 2:
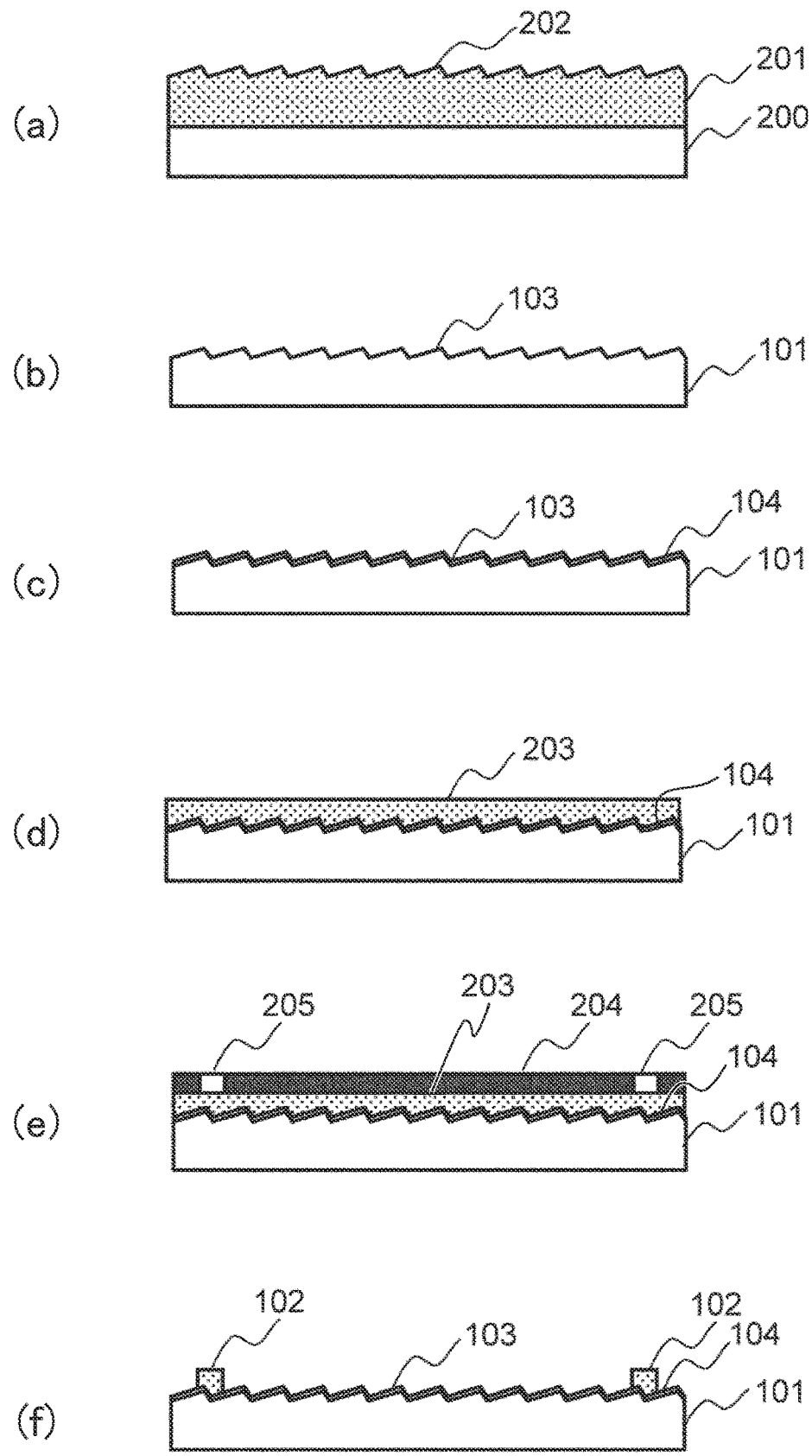
FIG. 2 is a drawing illustrating a method of forming an alignment mark forming pattern on a plane diffraction grating.

A description will be given to a method of forming the alignment mark forming pattern 102 in the plane diffraction grating 101 with reference to FIG. 2.

(a) Photoresist 201 is applied to a silicon substrate 200 and pattern exposure is performed to form a groove pattern 202 on the photoresist 201.

(b) After the formation of the groove pattern 202, etching is performed to transfer the groove pattern 202 onto the silicon substrate, producing a plane diffraction grating 101.

(c) A seed film 104 is formed on a groove pattern 103 of the plane diffraction grating 101. The seed film 104 functions as a cathode in a subsequent electroplating process (FIG. 1(*b*)) and acts to aid in plating metal on the groove pattern 103 of the plane diffraction grating 101. For example, a Ti film is formed as the seed film 104.

(d) Photoresist 203 is applied to the seed film 104.

(e) Using a photomask 204, the photoresist 203 is exposed to light. In the photomask 204, an opening 205 corresponding to an alignment mark is formed.

(f) Development is performed. The photoresist is left in a portion subjected to exposure and an alignment forming pattern 102 is formed. As a result, the alignment mark forming pattern 102 is formed on the plane diffraction grating 101. Though the seed film 104 is omitted in FIG. 1, the seed film is formed on the lattice plane of the plane diffraction grating 101 as described with reference to FIG. 2.

Figure 3A:
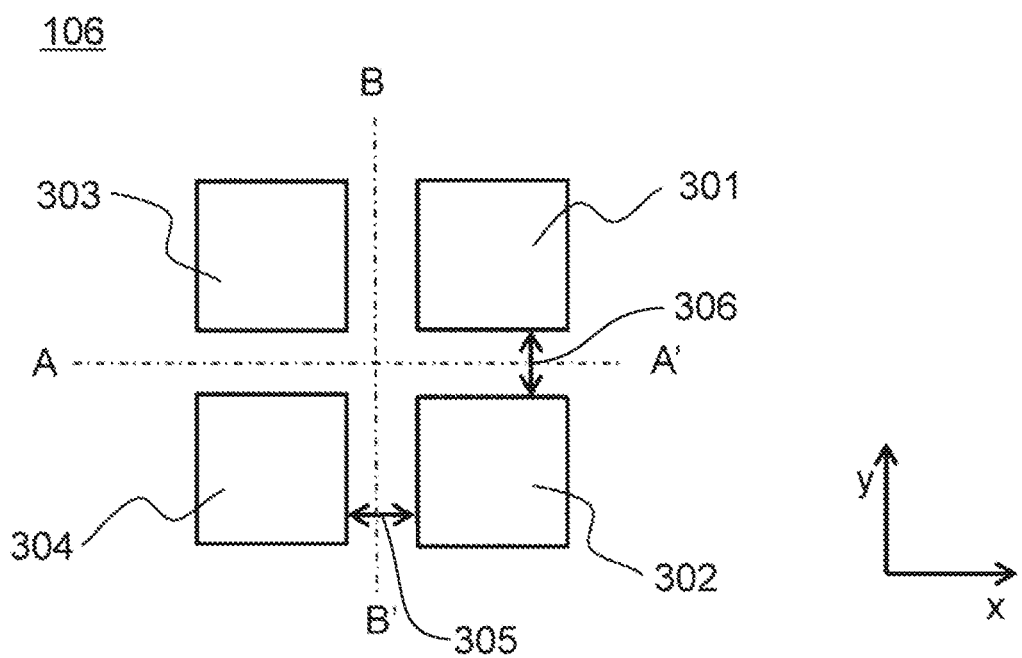
FIG. 3A illustrates an example of a shape of a metal thin film-side alignment mark.
Figure 3B:
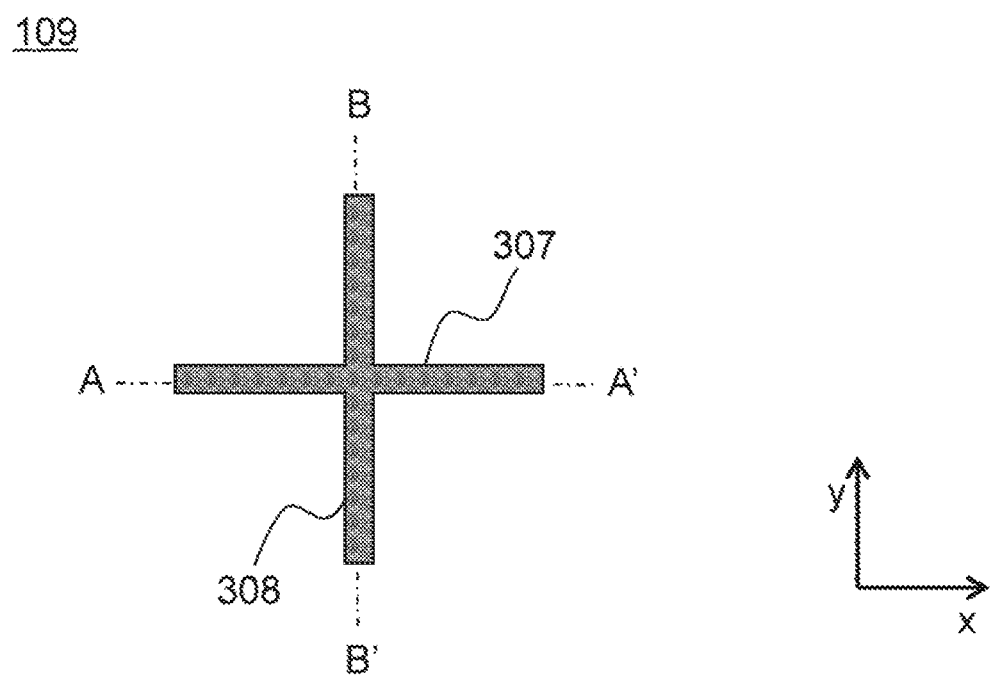
FIG. 3B illustrates an example of a shape of a convex fixing substrate-side alignment mark.

FIG. 3A illustrates an example of a shape of the metal thin film-side alignment mark 106 and FIG. 3B illustrates an example of a shape of the convex fixing substrate-side alignment mark 109. The alignment marks 106, 109 are selected as a combination of such marks that, when the marks are mated with each other, a misregistration can be visually recognized in at least two different directions (x-direction and y-direction in this example).

The metal thin film-side alignment mark 106 shown in FIG. 3A is constituted of four squares 301 to 304, which are so arranged that the squares are axisymmetric with respect to an A-A' axis and a B-B' axis. A spacing 305 between squares in the x-direction and a spacing 306 between squares in the y-direction are identical with each other. The convex fixing substrate-side alignment mark 109 shown in FIG. 3B is a mark in a cross shape in which a straight line 307 arranged on an A-A' axis and 308 arranged on a B-B' axis intersect with each other.

Figure 4A:
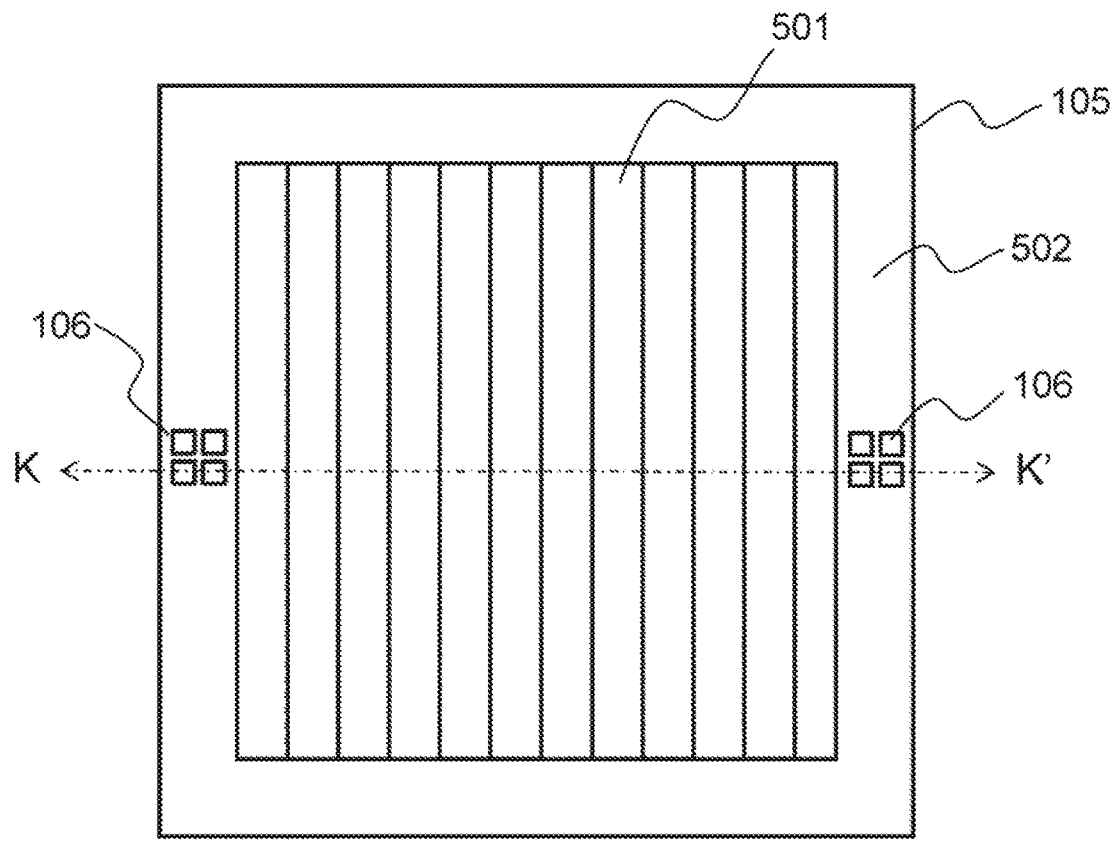
FIG. 4A illustrates an example (plan view) of a metal thin film with a metal thin film-side alignment mark formed on the film.
Figure 4B:
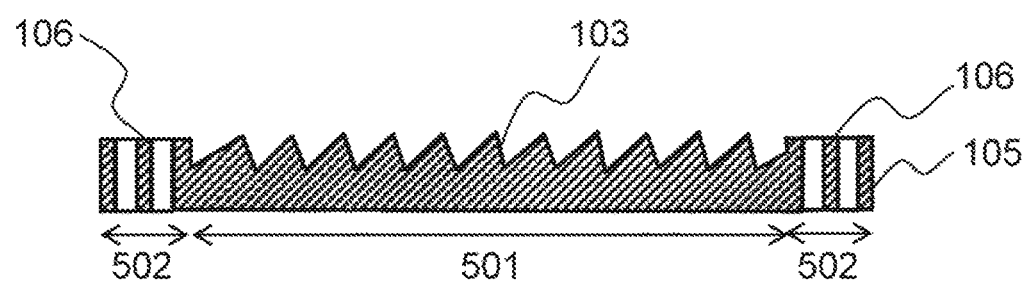
FIG. 4B illustrates an example (cross-sectional view) of a metal thin film with a metal thin film-side alignment mark formed on the film.

FIG. 4A and FIG. 4B illustrate an example of a metal thin film 105 in which a metal thin film-side alignment mark 106 shown in FIG. 3A is formed. FIG. 4A is a plan view and FIG. 4B is a cross-sectional view taken along line K-K'. In this example, the metal thin film-side alignment mark 106 is formed in an area (frame area 502) outside an area 501 where a groove pattern is inscribed. For this reason, the alignment mark 106 does not have any influence on the performance of the diffraction grating. Since the metal thin film-side alignment mark 106 is formed through the metal thin film 105, the mark can be checked from a surface opposite to a surface where the groove pattern 103 is inscribed.

Figure 5A:
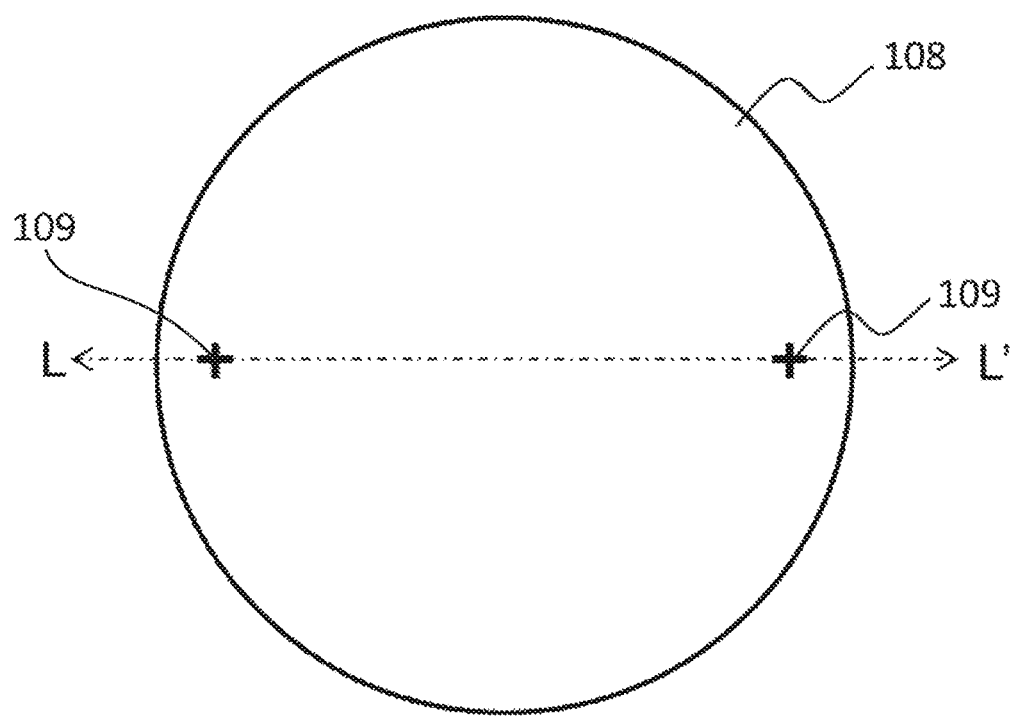
FIG. 5A illustrates an example (plan view) of convex fixing substrate with a convex fixing substrate-side alignment mark formed on the substrate.
Figure 5B:
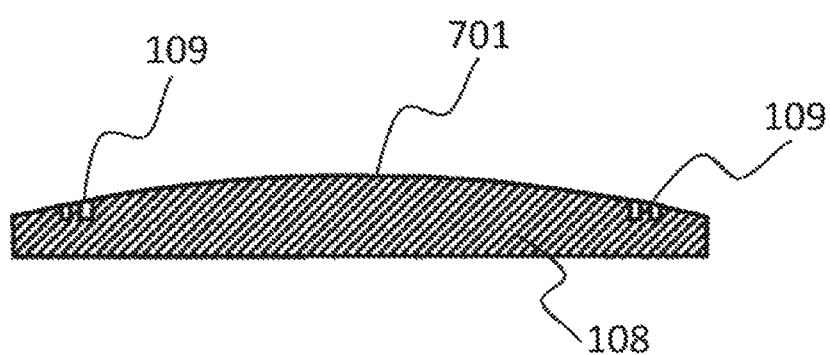
FIG. 5B illustrates an example (cross-sectional view) of a convex fixing substrate with a convex fixing substrate-side alignment mark formed on the substrate.

FIG. 5A and FIG. 5B illustrate an example of a convex fixing substrate 108 with a convex fixing substrate-side alignment mark 109 shown in FIG. 3B formed on the substrate. FIG. 5A is a plan view and FIG. 5B is a cross-sectional view taken along line L-L'. To form the convex fixing substrate-side alignment mark 109, laser processing or machining is used. The convex fixing substrate-side alignment mark 109 is formed on a convex surface 701 where a metal thin film 105 and a convex fixing substrate 108 are fixed together with adhesive 107 as shown in FIG. 5B.

The convex substrate-side alignment mark 109 is formed on the convex surface 701 of the convex fixing substrate 108. Meanwhile, the metal thin film-side alignment mark 106 is caused to penetrate the metal thin film 105 and is formed on an adhesive surface of the metal thin film 105. As a result, both the alignment marks 106 can be mated with each other at surfaces where the alignment marks are brought into contact with each other; therefore, accuracy in adjustment can be enhanced. Forming the metal thin film-side alignment mark 106 through the metal thin film 105 is one technique for forming a mark on an adhesive surface of the metal thin film 105 and the present invention is not limited to this technique. Any technique is acceptable as long as the technique is related to an observing technique for alignment and the metal thin film-side alignment mark 106 can be visually recognized from an adhesive surface of the metal thin film 105. For example, an alignment mark that does not penetrate may be formed in an adhesive surface of the metal thin film 105 or may be formed by such a technique as printing.

Figure 6:
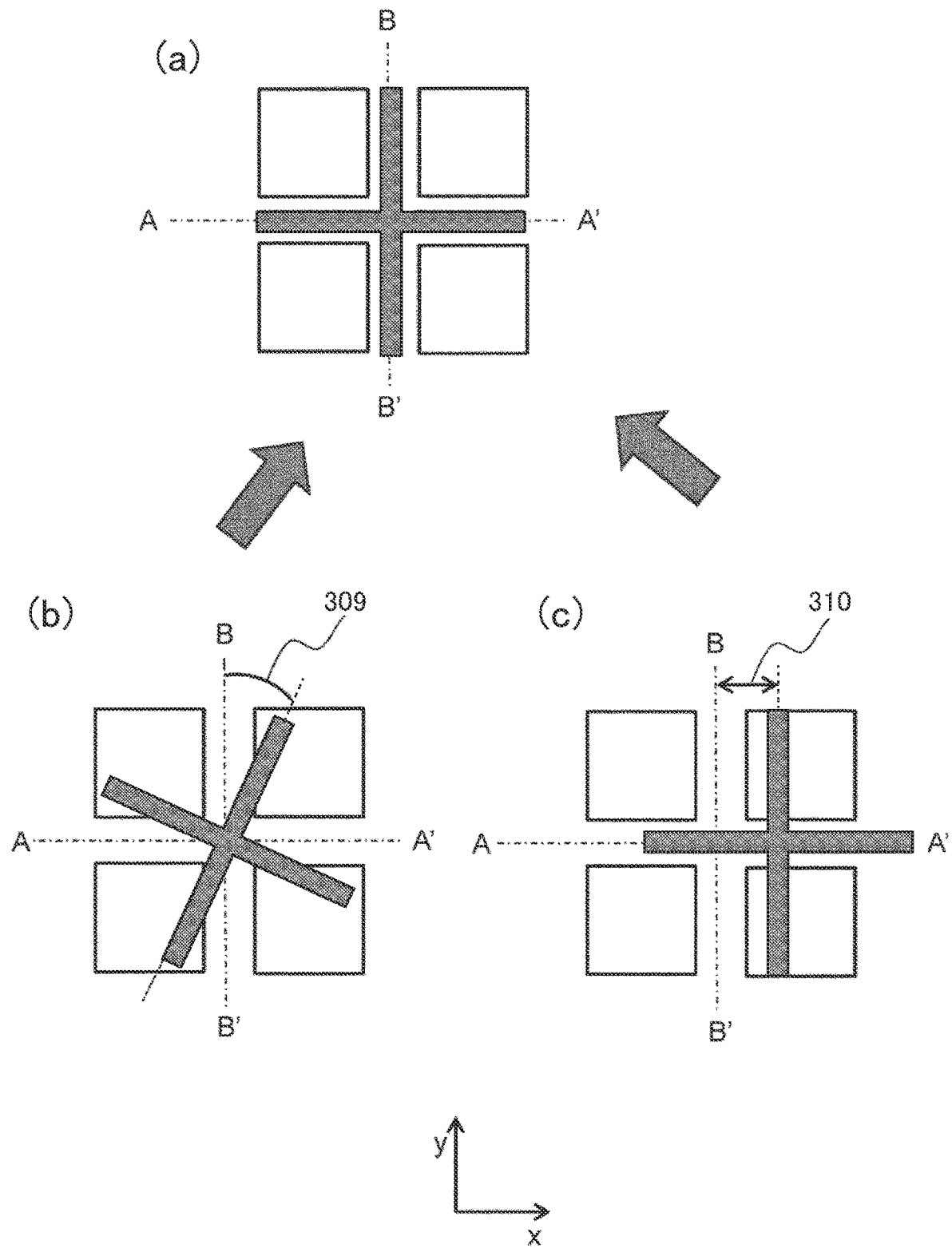
FIG. 6 is a drawing showing a state in which a metal thin film-side alignment mark and a convex fixing substrate-side alignment mark are mated with each other.

FIG. 6 is a drawing showing a state in which a metal thin film-side alignment mark shown in FIG. 3A and a convex fixing substrate-side alignment mark shown in FIG. 3B are mated with each other. The drawing of (a) shows a state in which the alignment marks are matched with each other. The drawing of (b) shows a state in which a displacement 309 has occurred in the direction of rotation and the drawing of (c) shows a state in which a displacement 310 has occurred in the x-direction.

When a displacement 309 has occurred in the direction of rotation as shown in the drawing of (b), the groove pattern of the diffraction grating can be matched with the axial direction of the convex fixing substrate 108 by eliminating the displacement in the direction of rotation and adjusting alignment so as to achieve the state shown in the drawing of (a). When a misregistration 310 has occurred as shown in the drawing of (c), the position of the groove pattern of the diffraction grating and the position of the convex fixing substrate can be matched with each other by eliminating the misregistration and adjusting alignment so as to achieve the state shown in the drawing of (a). Thus, a groove interval of the groove pattern and a position on the curved fixing substrate can be matched with each other with accuracy.

Figure 7A:
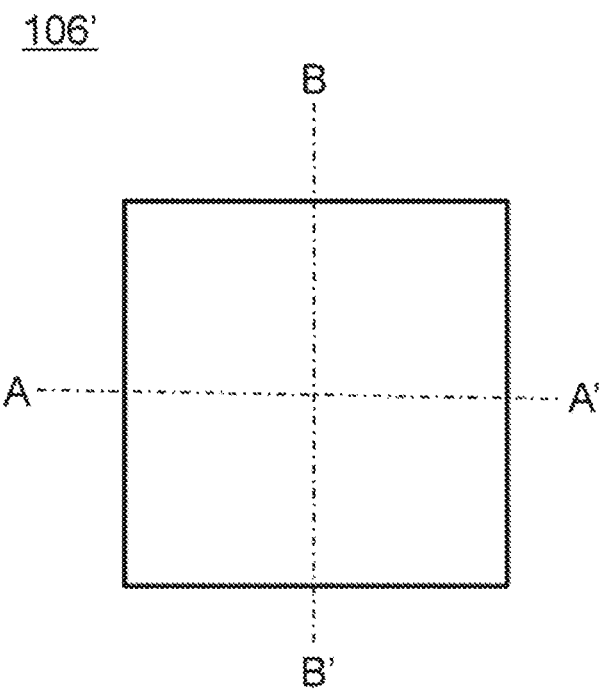
FIG. 7A illustrates another example of a shape of a metal thin film-side alignment mark.
Figure 7B:
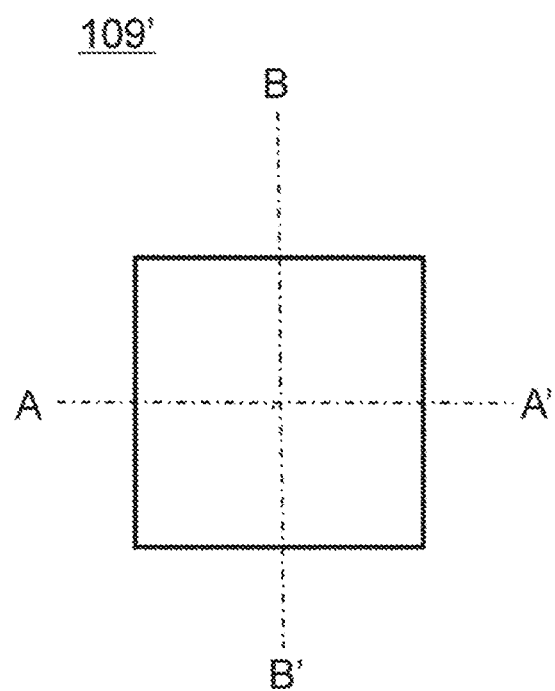
FIG. 7B illustrate another example of a shape of a convex fixing substrate-side alignment mark.
Figure 7C:
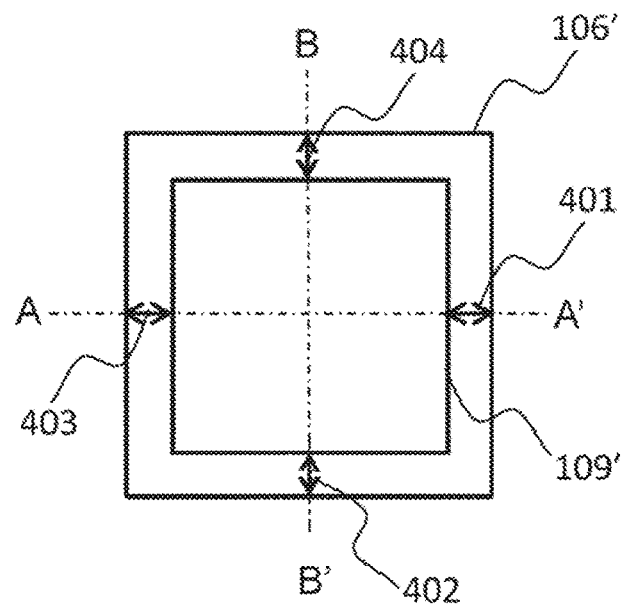
FIG. 7C is a drawing showing a state in which a metal thin film-side alignment mark and a convex fixing substrate-side alignment mark are mated with each other.

A shape of an alignment mark is not limited to those shown in FIGS. 3A and 3B. FIGS. 7A to 7C illustrate another example of a shape of an alignment mark. FIG. 7A illustrates a metal thin film-side alignment mark 106' and FIG. 7B illustrates a convex fixing substrate-side alignment mark 109'. These marks are formed respectively on the metal thin film 105 and the convex fixing substrate 108 by the same method as described above. In this example, both the alignment marks are square in shape and one side of the convex fixing substrate-side alignment mark 109' is shorter in length than one side of the metal thin film-side alignment mark 106'.

FIG. 7C illustrates a state in which both the alignment marks are matched with each other. One method of adjusting the alignment marks is to match the respective alignment marks with each other so that spacings 401, 402, 403, 404 generated when the metal thin film-side alignment mark 106' and the convex substrate-side alignment mark 109' are mated with each other are identical.

In this example, squares different in size are used as examples of shapes of alignment marks but any polygon brings about the same advantageous effects. When an alignment mark is provided in a plurality of places as shown in FIG. 4A and FIG. 5A, the alignment mark may be circular.

Figure 8A:
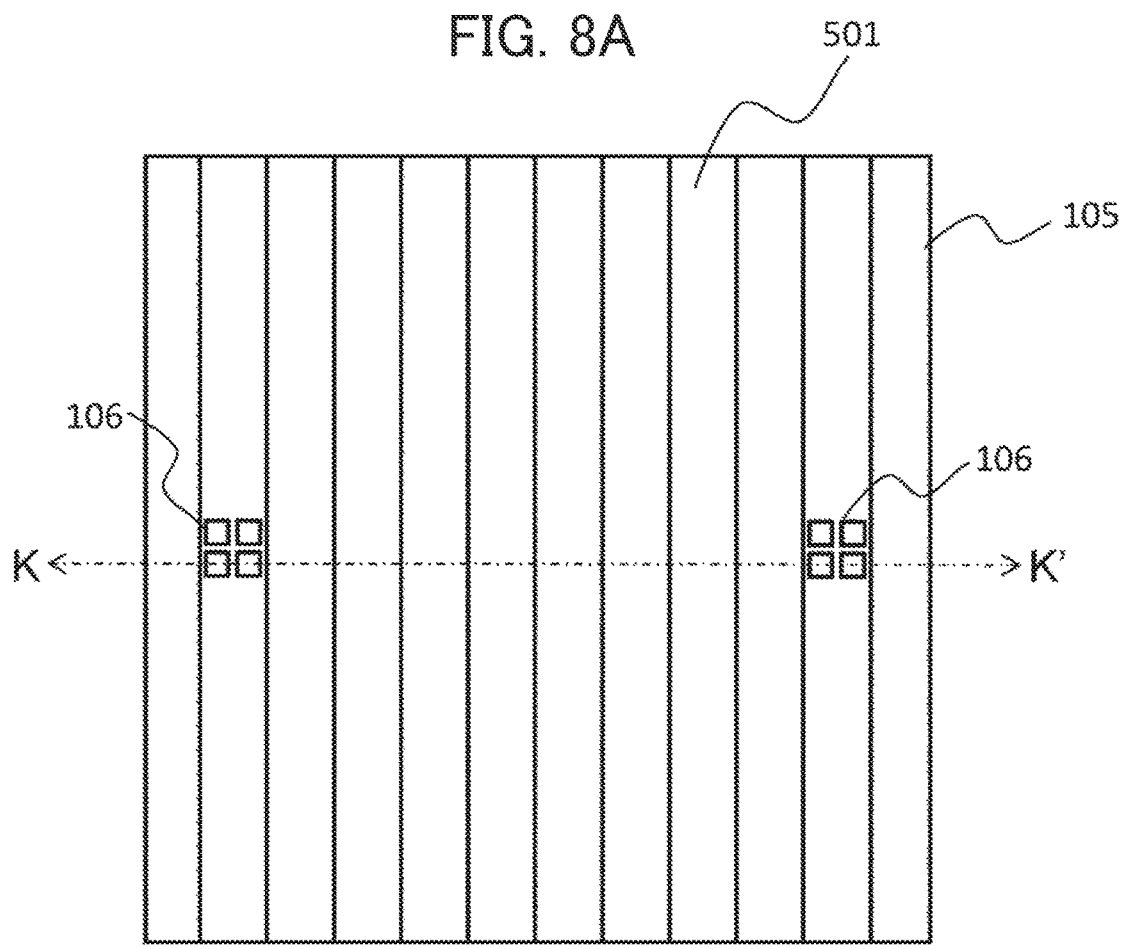
FIG. 8A illustrates an example (plan view) of a metal thin film with a metal thin film-side alignment mark formed on the film.
Figure 8B:
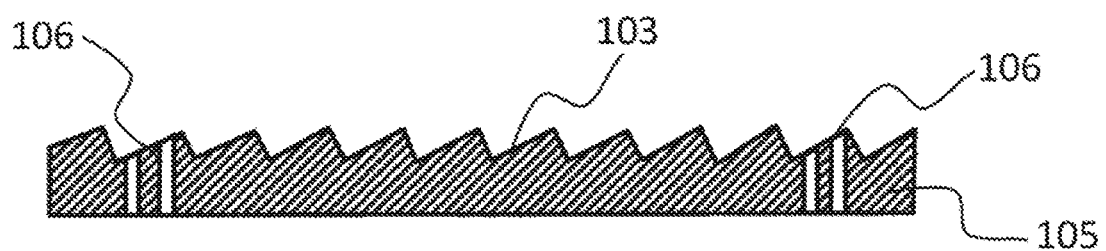
FIG. 8B illustrates an example (cross-sectional view) of a metal thin film with a metal thin film-side alignment mark formed on the film.

In FIG. 4A, the alignment mark is formed outside the area 501 where the groove pattern is inscribed but the present invention is not limited to this configuration. FIG. 8A and FIG. 8B illustrate another example of arrangement of the metal thin film-side alignment mark 106. FIG. 8A is a plan view and FIG. 8B is a cross-sectional view taken along line K-K'. In this example, a metal thin film-side alignment mark 106 is formed in an area 501 where a groove pattern is formed. The metal thin film-side alignment mark 106 may be formed in a position within the area 501 where the groove pattern is inscribed unless the optical performance of the diffraction grating is influenced. Since a frame portion is unnecessary, a concave diffraction grating with a smaller surface area can be fabricated.

Second Embodiment

Figure 9:
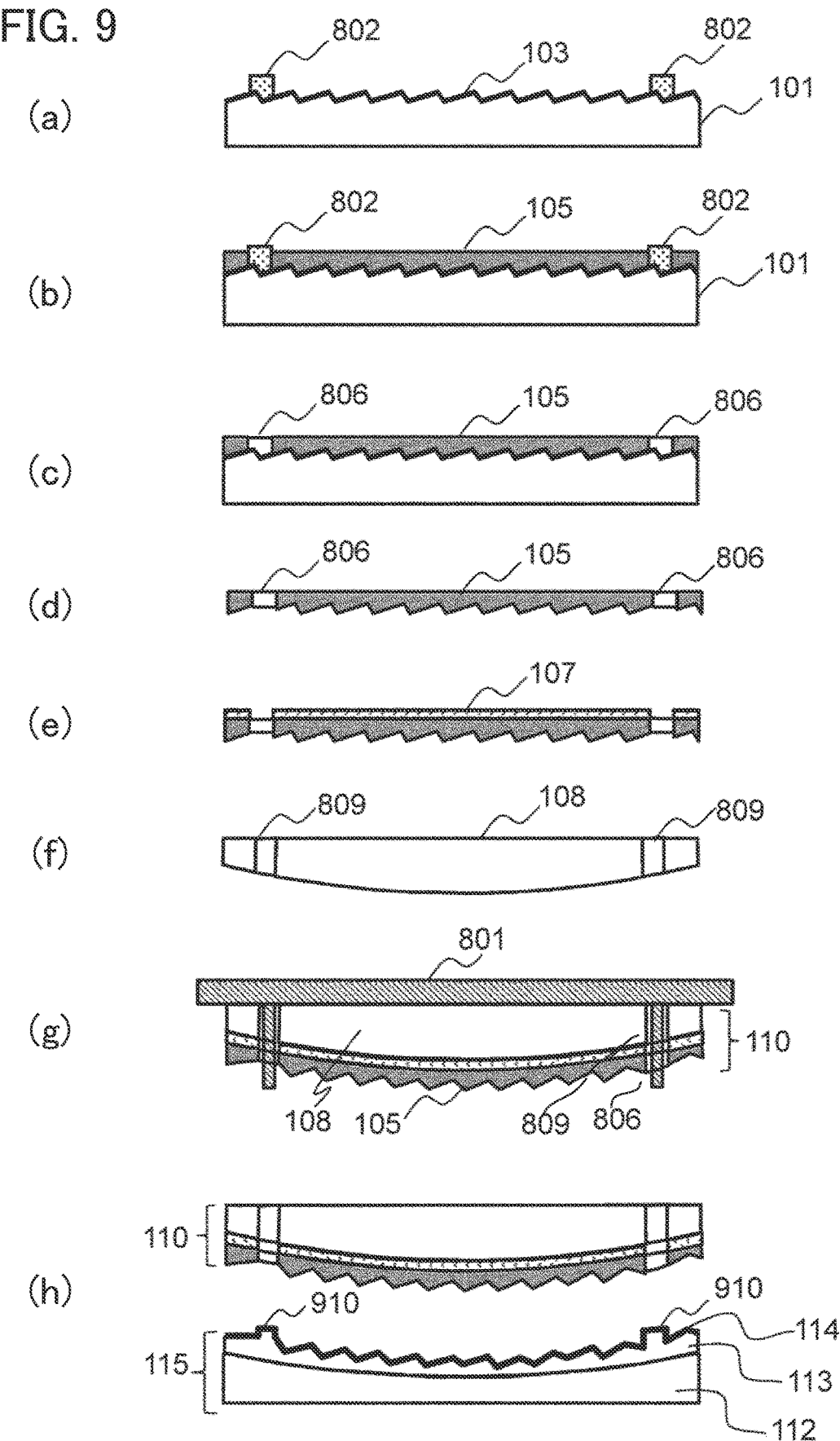
FIG. 9 is a drawing illustrating a manufacturing method of a concave diffraction grating according to a second embodiment.

FIG. 9 illustrates a manufacturing method of a concave diffraction grating as a second embodiment. Configuration elements common to those in the first embodiment will be marked with the same reference signs and a redundant explanation will be omitted.

(a) An alignment hole forming pattern 802 is formed on a plane diffraction grating 101 obtained by forming a groove pattern 103 on a silicon substrate. A method of forming the pattern 802 is the same as the method of forming the pattern 102 shown in FIG. 2. The alignment hole forming pattern 802 may be formed in an area where the groove pattern of the diffraction grating is inscribed as shown in the drawing or may be formed in an area (frame portion) outside an area where the groove pattern of the diffraction grating is inscribed.

(b)(c) Using electroplating, a metal thin film 105 is formed on the plane diffraction grating 101 with the alignment hole forming pattern 802 formed on the grating. Thus, the metal thin film 105 with the groove pattern of the plane diffraction grating 101 transferred onto the film can be fabricated. Subsequently, the alignment hole forming pattern 802 is removed to form a metal thin film-side alignment hole 806 in the metal thin film 105.

(d)(e) The metal thin film 105 is stripped from the plane diffraction grating 101. Subsequently, adhesive 107 is applied.

(f) A convex substrate-side alignment hole 809 is formed in a convex fixing substrate 108. For a material of the convex fixing substrate 108, for example, glass or silicon is used. In the convex fixing substrate 108, the convex substrate-side alignment hole 809 is provided in such a position that a groove interval of a groove pattern of the metal thin film 105 and a curved surface of the convex fixing substrate are matched with each other, by mating with a metal thin film-side alignment hole 806 provided in a metal thin film 105.

(g) Using an aligning jig 801, the metal thin film-side alignment hole 806 and the convex fixing substrate-side alignment hole 809 are mated and fixed with each other to fabricate a master 110 of a concave diffraction grating.

(h) The groove pattern of the diffraction grating of the master 110 is transferred to fabricate a concave diffraction grating 115.

The second embodiment is characterized in that the aligning jig 801 is used when the metal thin film 105 and the convex fixing substrate 108 are adjusted.

Figure 10A:
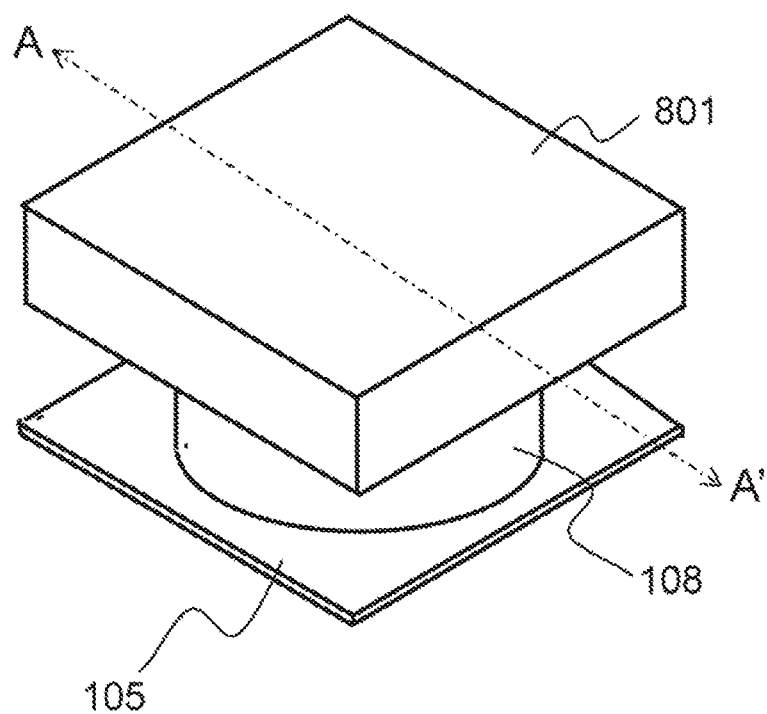
FIG. 10A is a drawing (bird's eye view) illustrating a method of adjusting a metal thin film 105 and a convex fixing substrate 108.
Figure 10B:
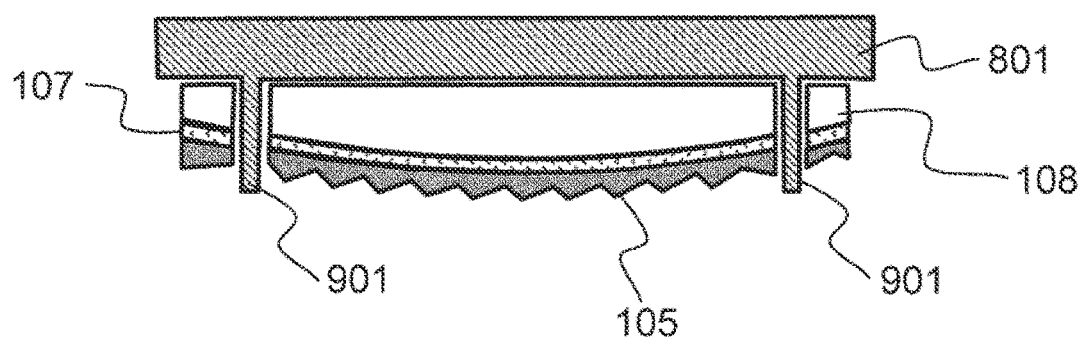
FIG. 10B is a drawing (cross-sectional view) illustrating a method of adjusting a metal thin film 105 and a convex fixing substrate 108.

A description will be given to a method of adjusting the metal thin film 105 and the convex fixing substrate 108 with reference to FIG. 10A and FIG. 10B. FIG. 10A is a bird's eye view illustrating a method of adjusting the metal thin film 105 and the convex fixing substrate 108 and FIG. 10B is a cross-sectional view taken along line A-A'. As shown in FIG. 10B, the aligning jig 801 is provided with an aligning pin 901 and enables mechanical alignment using the pin 901. To prevent damage to the convex fixing substrate 108 due to thermal expansion, a material identical in coefficient of linear expansion with the convex fixing substrate 108 is used to make the aligning jig 801 (including the aligning pin 901).

Figure 11A:
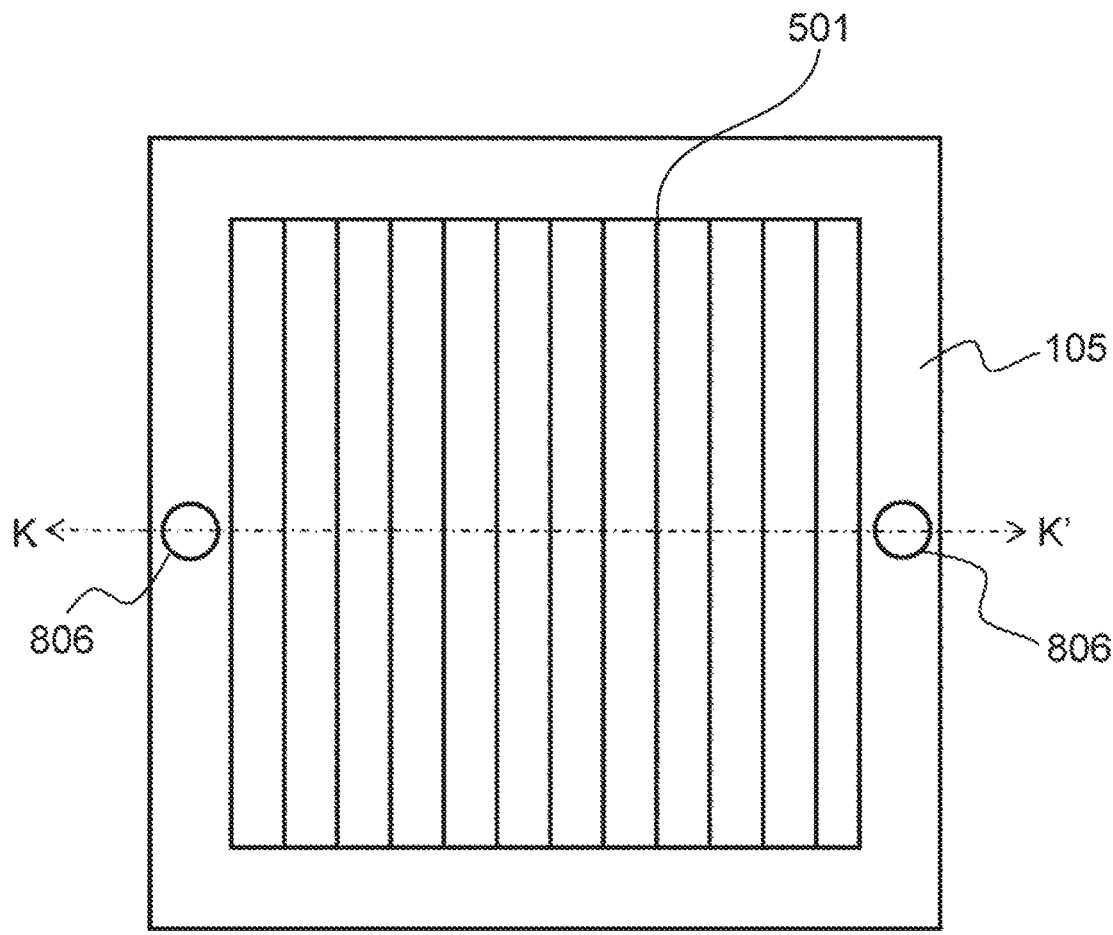
FIG. 11A illustrates an example (plan view) of a metal thin film with a metal thin film-side alignment hole formed in the film.
Figure 11B:
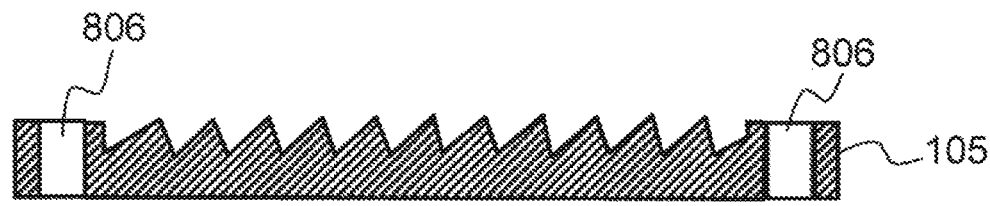
FIG. 11B illustrate an example (cross-sectional view) of a metal thin film with a metal thin film-side alignment hole formed in the film.

FIG. 11A is a plan view of a metal thin film 105 with a metal thin film-side alignment hole 806 formed in the film and FIG. 11B is a cross-sectional view taken along line K-K'. In this example, the metal thin film-side alignment hole 806 is circular.

Figure 12A:
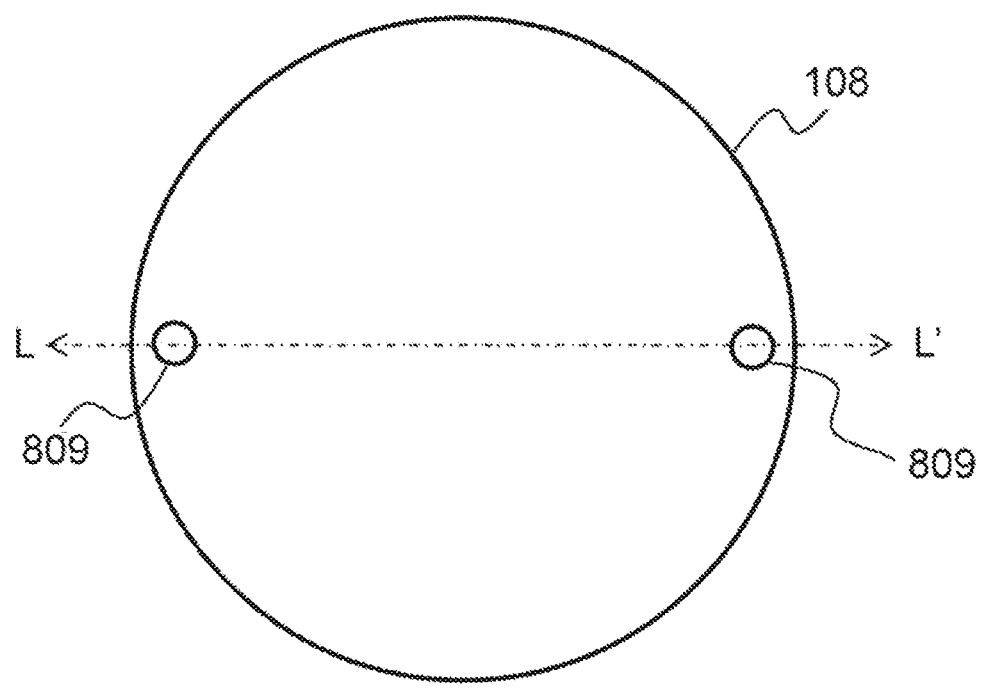
FIG. 12A illustrates an example (plan view) of a convex fixing substrate with a convex fixing substrate-side alignment hole formed in the substrate.
Figure 12B:
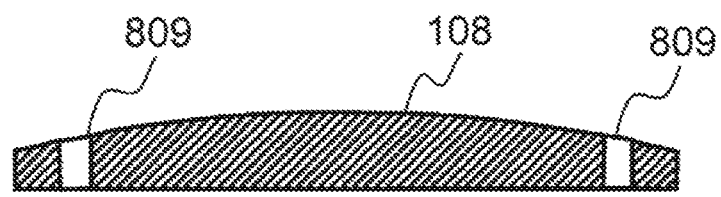
FIG. 12B illustrates an example (cross-sectional view) of a convex fixing substrate with a convex fixing substrate-side alignment hole formed in the substrate.

FIG. 12A is a plan view of a convex fixing substrate 108 with a convex fixing substrate-side alignment hole 809 formed in the substrate and FIG. 12B is a cross-sectional view taken along line L-L'. To form the convex fixing substrate-side alignment hole 809, laser processing or machining is used. The convex fixing substrate-side alignment hole 809 is provided with a structure of a through hole so that an aligning pin 901 is passed through the hole.

A description has been given to a manufacturing method of a concave diffraction grating based on two embodiments. In either manufacturing method, an alignment mark 910 (refer to FIG. 1 and FIG. 9) is left in a replica of a fabricated concave diffraction grating. For this reason, when the concave diffraction grating is assembled into an analyzer and an adjustment is made, the alignment mark 910 can be used in the adjustment. Since the alignment mark 910 can be used to precisely coordinate a groove direction and the like with a designed position, variation in optical performance, such as image forming capability, can be reduced and high precision of analysis can be maintained.

LIST OF REFERENCE SIGNS

101 . . . Plane diffraction grating
102 . . . Alignment mark forming pattern
103 . . . Groove pattern
104 . . . Seed film
105 . . . Metal thin film
106 . . . Metal thin film-side alignment mark
107 . . . Adhesive
108 . . . Convex fixing substrate
109 . . . Convex fixing substrate-side alignment mark
110 . . . Master
112 . . . Concave fixing substrate
113 . . . Resin
114 . . . Reflection film
115 . . . Concave diffraction grating
200 . . . Silicon substrate
201 . . . Photoresist
202 . . . Groove pattern
203 . . . Photoresist
204 . . . Photomask
801 . . . Aligning jig
806 . . . Metal thin film-side alignment hole
809 . . . Convex substrate-side alignment hole
901 . . . Aligning pin
910 . . . Alignment mark on the side of replica of concave diffraction grating
1201 . . . White light source
1202a . . . Condenser lens
1203 . . . Sample chamber
1202b . . . Condenser lens
1204 . . . Slit
1205 . . . Detector

The invention claimed is:

1. A manufacturing method of a concave diffraction grating, comprising the steps of:
transferring a groove pattern formed on a plane diffraction grating and having an unequal groove interval onto a metal thin film;
forming a first alignment mark on a convex surface of a fixing substrate having the convex surface to fix the metal thin film;
forming a second concave alignment mark on a surface of the metal thin film;
after forming the second concave alignment mark, applying an adhesive to a surface of the metal thin film;
after forming the first alignment mark in a convex surface of the fixing substrate and after forming the second concave alignment mark in the metal thin film, fabricating a master by mating the second concave alignment mark formed on the surface of the metal thin film with the first alignment mark to perform alignment and bonding the adhesive of the metal thin film and the convex surface of the fixing substrate to each other; and
transferring a groove pattern of the metal thin film of the master to fabricate a concave diffraction grating.

2. The manufacturing method of the concave diffraction grating according to claim 1, comprising the steps of:
transferring a groove pattern of the concave diffraction grating to fabricate a convex diffraction grating; and
transferring a groove pattern of the convex diffraction grating to further fabricate a concave diffraction grating.

3. The manufacturing method of the concave diffraction grating according to claim 1, comprising a step of:
forming a plurality of the first alignment marks on the convex surface of the fixing substrate,
wherein on an adhesive surface of the metal thin film, a plurality of the second alignment marks respectively corresponding to the first alignment marks are formed.

4. The manufacturing method of the concave diffraction grating according to claim 1,
wherein the first alignment marks and the second alignment marks are a combination of such marks that, when mated with each other, misregistration in two different directions can be visually recognized.

5. The manufacturing method of the concave diffraction grating according to claim 4,
wherein the first alignment marks and the second alignment marks are a combination of marks different in size and identical in shape.

6. The manufacturing method of the concave diffraction grating according to claim 1, comprising the steps of:
forming a pattern to form the second alignment marks on the plane diffraction grating;
using electroplating to the plane diffraction grating with the pattern formed on the grating to form the metal thin film; and
removing the pattern and stripping the metal thin film from the plane diffraction grating to form the second alignment marks on the metal thin film.

7. The manufacturing method of the concave diffraction grating according to claim 6,
wherein the pattern is formed in an area where the groove pattern of the plane diffraction grating is formed.

8. A manufacturing method of a concave diffraction grating, comprising the steps of:
transferring a groove pattern formed on a plane diffraction grating and having an unequal groove interval onto a metal thin film;
forming a first alignment hole penetrating a fixing substrate having a convex surface to fix the metal thin film;
forming a second concave alignment hole penetrating a surface of the metal thin film;
after forming the second concave alignment hole, applying an adhesive to a surface of the metal thin film;
after forming the first alignment hole in a convex surface of the fixing substrate and after forming the second concave alignment hole in the metal thin film, fabricating a master by mating the second concave alignment hole formed in the metal thin film with the first alignment hole by an aligning pin provided in an aligning jig to perform alignment and boding an adhesive surface of the metal thin film and the convex surface of the fixing substrate to each other; and
transferring a groove pattern of the metal thin film of the master to fabricate a concave diffraction grating.

9. The manufacturing method of the concave diffraction grating according to claim 8, comprising the steps of:
transferring a groove pattern of the concave diffraction grating to fabricate a convex diffraction grating; and transferring a groove pattern of the convex diffraction grating to further fabricate a concave diffraction grating.

10. The manufacturing method of the concave diffraction grating according to claim 8, comprising a step of:
forming a plurality of the first alignment holes in the fixing substrate, wherein in the metal thin film, a plurality of the second alignment holes respectively corresponding to the first alignment holes are formed.

11. A concave diffraction grating, comprising:
a resin substrate provided on a concave surface of a substrate, with a second groove pattern and a third alignment mark formed by transferring a first groove pattern and a first alignment mark of a master;
a reflection film covering the concave surface of the resin substrate; and
a concave fixing substrate on which the resin substrate is fixed,
wherein the master is formed by fixing a metal thin film with the first groove pattern having unequal groove intervals and a having a second concave alignment mark formed on the metal thin film on a fixing substrate having a convex surface with the first alignment mark formed in the convex surface in such a manner that the first alignment mark and the second concave alignment mark are mated with each other, the metal thin film further including an adhesive to bond with the convex surface of the fixing substrate.

12. An analyzer comprising:
a light source;
a sample chamber in which a sample is placed;
a concave diffraction grating that spectrally disperses light from the light source transmitted through the sample chamber into a plurality of wavelength components; and
a detector having a flat detecting surface that detects diffracted light from the concave diffraction grating,
wherein the concave diffraction grating includes: a resin substrate provided on a concave surface of the substrate with a second groove pattern and a third alignment mark formed by transferring a first groove pattern and a first alignment mark of a master; a reflection film covering the concave surface of the resin substrate; and a concave fixing substrate on which the resin substrate is fixed,
wherein the master is formed by fixing a metal thin film with the first groove pattern having unequal groove intervals and having a second concave alignment mark formed on the metal thin film on a fixing substrate having a convex surface with the first alignment mark formed in the convex surface in such a manner that the first alignment mark and the second concave alignment mark are mated with each other, the metal thin film further including an adhesive to bond with the convex surface of the fixing substrate; and
wherein the third alignment mark is used to adjust the concave diffraction grating.

\* \* \* \* \*